United States Patent
Testa et al.

(10) Patent No.: US 9,276,870 B2
(45) Date of Patent: Mar. 1, 2016

(54) SWITCHING NODE WITH LOAD BALANCING OF BURSTS OF PACKETS

(75) Inventors: Patrizia Testa, Rome (IT); Angelo Germoni, Rome (IT); Marco Listanti, Rome (IT)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 109 days.

(21) Appl. No.: 13/809,377

(22) PCT Filed: Aug. 25, 2010

(86) PCT No.: PCT/EP2010/062367
§ 371 (c)(1),
(2), (4) Date: Mar. 6, 2013

(87) PCT Pub. No.: WO2012/003890
PCT Pub. Date: Jan. 12, 2012

(65) Prior Publication Data
US 2013/0201826 A1    Aug. 8, 2013

(30) Foreign Application Priority Data
Jul. 9, 2010  (EP) .................................... 10169028

(51) Int. Cl.
*H04L 12/50*  (2006.01)
*H04L 12/911*  (2013.01)
(Continued)

(52) U.S. Cl.
CPC ................ *H04L 47/70* (2013.01); *H04L 47/10* (2013.01); *H04L 47/125* (2013.01);
(Continued)

(58) Field of Classification Search
CPC ................ H04L 2012/568; H04L 2012/5684; H04L 2012/569; H04L 12/569; H04L 47/125; H04L 29/08288; H04L 29/0873; H04L 12/5689; H04L 47/28; H04L 67/1038; H04L 47/70; H04W 28/08; H04W 28/02; H04W 28/10

USPC ................ 370/229–235, 387–389, 392, 394, 370/395.21, 395.53, 400–401, 412–413, 370/419, 473–474, 476; 709/223–224
See application file for complete search history.

(56) References Cited

U.S. PATENT DOCUMENTS 6,628,668 B1 * 9/2003 Hutzli ................ H04L 12/5695
370/395.21
7,539,750 B1 * 5/2009 Parker .................... G06F 15/16
709/224

(Continued)

FOREIGN PATENT DOCUMENTS

| CN | 1512698 A | 7/2004 |
|---|---|---|
| CN | 1561021 A | 1/2005 |
| EP | 1089498 A2 | 4/2001 |

OTHER PUBLICATIONS

Yong Lui, et al., "Multipath Traffic Engineering in WDM Optical Burst Switching Networks", Apr. 1, 2009, 10 pages, vol. 57, No. 4, IEEE Transactions on Communications, Piscataway, US.

(Continued)

*Primary Examiner* — Charles C Jiang
*Assistant Examiner* — Mohamed Kamara
(74) *Attorney, Agent, or Firm* — Nicholson De Vos Webster & Elliott LLP

(57) ABSTRACT

A packet switching node is coupled by links to other nodes of a network, and receives and assembles packets belonging to a specified packet flow, into bursts of packets with a burst control packet indicating a sequence of the burst in the flow. The node determines whether to distribute the flow across several links. If so, the bursts are then forwarded for switching to the output ports of the selected links. Distributing the flow over multiple links can enable more flexible and efficient filling of allocated bandwidth on links, as traffic increases. To reduce the risk of losing the order of packets the sequence of the bursts is indicated for use in reordering at intermediate nodes during transmission through the network.

20 Claims, 15 Drawing Sheets

(51) Int. Cl.
  *H04L 12/801* (2013.01)
  *H04L 12/803* (2013.01)
  *H04J 14/02* (2006.01)

(52) U.S. Cl.
  CPC ......... *H04J 14/0212* (2013.01); *H04J 14/0282* (2013.01); *H04J 14/0283* (2013.01); *H04J 14/0286* (2013.01); *H04Q 2213/1331* (2013.01); *H04Q 2213/13106* (2013.01); *H04Q 2213/13164* (2013.01); *H04Q 2213/13166* (2013.01); *H04Q 2213/13389* (2013.01)

(56) References Cited

U.S. PATENT DOCUMENTS

| | | | | |
|---|---|---|---|---|
| 7,613,209 | B1* | 11/2009 | Nguyen | H04L 47/10 370/474 |
| 7,710,869 | B1* | 5/2010 | Gleichauf | H04L 45/00 370/229 |
| 7,971,121 | B1* | 6/2011 | Conway | H04L 1/0045 370/360 |
| 2005/0177749 | A1* | 8/2005 | Ovadia | H04J 14/0227 726/5 |
| 2006/0153147 | A1* | 7/2006 | Chillariga | H04B 1/7143 370/337 |
| 2006/0256803 | A1* | 11/2006 | Nakata | H04L 1/1887 370/412 |
| 2008/0049774 | A1* | 2/2008 | Swenson | H04L 45/7453 370/412 |
| 2008/0285975 | A1 | 11/2008 | Lee et al. | |
| 2009/0142055 | A1* | 6/2009 | Qiu | H04J 14/0227 398/45 |
| 2012/0314703 | A1* | 12/2012 | Testa | H04L 12/2852 370/389 |

OTHER PUBLICATIONS

Guru P.V. Thodime, et al., "Dynamic Congestion-Based Load Balanced Routing in Optical Burst-Switched Networks", Dec. 1-5, 2003, 5 pages, vol. 5, IEEE Global Telecommunications Conference, New York, US.

Jing Li, et al., "Load Balancing using Adaptive Alternate Routing in IP-over-WDM Optical Burst Switching Networks", Oct. 1, 2003, 10 pages, vol. 5285, Proceedings of SPIE.

Chunming Qiao, et al., "Optical burst switching (OBS)—a new paradigm for an Optical Internet, Journal of High Speed Networks", Jan. 1, 1999, 16 pages, vol. 8, No. 1, IOS Press, Amsterdam, NL.

International Search Report, Application No. PCT/EP2010/062367, dated Oct. 13, 2010, 3 pages.

Office Action from China Application No. 201080067970.3, dated Aug. 14, 2014, 48 pages.

Liu, et al., "Multipath Traffic Engineering in WDM Optical Burst Switching Networks", IEEE Transactions on Communications, vol. 57, No. 4, Apr. 2009, pp. 1099-1108.

Kandula et al., "Dynamic Load Balancing Without Packet Reordering", ACM SIGCOMM Computer Communication Review, vol. 37, No. 2, Apr. 2007, pp. 53-62.

"Next Generation Terabit Switch/Routers: Transforming Network Architectures", Force10 Networks, Inc. 2006, pp. 1-8.

"The Optical Switching Revival: Rebuilding Optical Networks for Packets", Heavy Reading, vol. 7, No. 3, Mar. 2009, pp. 1-47.

"Ehterburst Packet WDM System Overview", Matisse Networks, 2008, pp. 1-8.

"IEEE Standard for Local and metropolitan are networks—Link Aggregation", IEEE Computer Society, IEEE std 802.1AX, Nov. 3, 2008, 163 Pages.

Gabriel Bracha, "Evolving Switch Fabric Scheduling", designlines Wireless & Networking, Jan. 3, 2003, 4 pages.

* cited by examiner

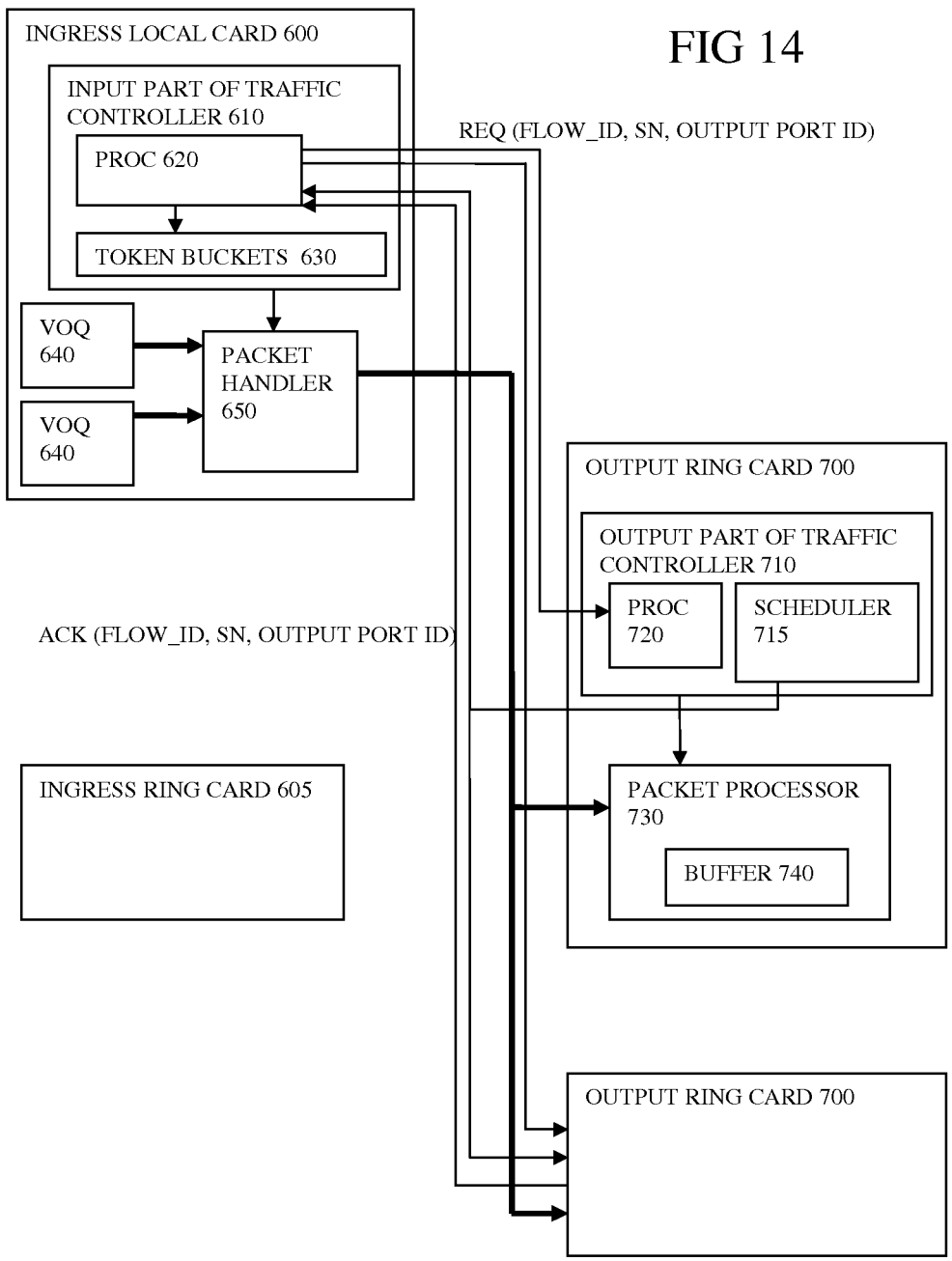

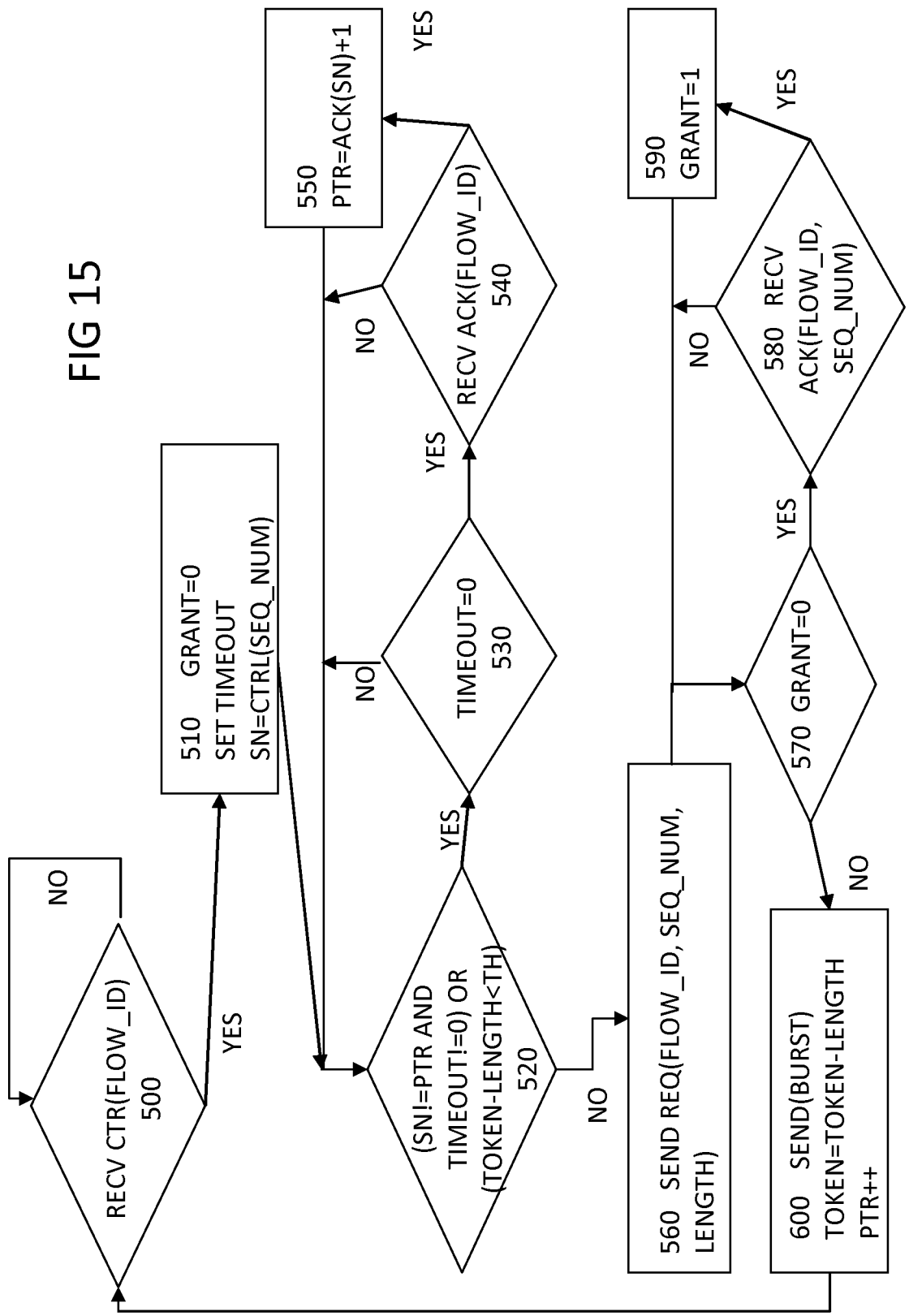

SWITCHING NODE WITH LOAD BALANCING OF BURSTS OF PACKETS

CROSS-REFERENCE TO RELATED APPLICATIONS

This application is a National stage of International Application No. PCT/EP2010/062367, filed Aug. 25, 2010, which claims priority to EP Application No. 10169028.7, filed Jul. 9, 2010, which are hereby incorporated by reference.

TECHNICAL FIELD

This invention relates to methods of operating packet switching nodes, to methods of controlling switching, to corresponding computer programs, to traffic controllers, and to packet switching nodes.

BACKGROUND

The need to achieve low cost delivery of new bandwidth hungry services such as IPTV (internet protocol television) has required the re-design of the networks for an efficient and flexible packet transport. Transport technologies, historically related to SDH (synchronous digital highway), are evolving towards Ethernet which has a higher networking responsibility.

However the deployment of Ethernet networks demand integration with the optical layer since metro bandwidth requirements has lead to the adoption of DWDM optical transmission systems that rely on a circuit-oriented architecture. Different solutions aiming at reducing capital and operational costs while integrating packet and circuit layers have arisen. For example there are systems based on a single-platform node architecture with multi-layer switching structure. They combine the WDM/OTN optical layer with the new connection oriented Ethernet transport technologies such as PBB-TE (provide backbone bridge traffic engineering) and MPLS-TP (Multi-Protocol Label Switching Transport Profile). Such technologies are able to replicate SDH carrier class performance and provide tunnel switching, allowing removal of coupling between transport and services, and aggregation of flows over WDM wavelengths.

On the other hand there are solutions, such as Matisse "packet WDM", based on an optical burst switching paradigm that eliminates the need for optical circuits and aims at assuring the "any-to-any" flexibility of Ethernet.

In parallel, high speed Ethernet switches with fully distributed architecture are continuing to evolve to accommodate changes in networked applications and to pave the way for the next generation of Ethernet at 100 Gbps.

Solutions based on MPLS-TP/PBB-TE carrier Ethernet technologies present limited scalability and flexibility, and require a sophisticated control plane to coordinate different switching layers so as to optimize bandwidth utilization. Alternative solutions based on OBS require complex resource management (Medium Access Control (MAC) scheme) to exploit their potentiality in capacity efficiency and at the same time are limited by technology constraints. The current state of the art does not allow, for instance, efficient contention resolution mechanisms due to the lack of practical all-optical wavelength converters.

The best trade-off between connectivity and bandwidth may be achieved through next generation Ethernet switches by solving critical issues such as scalable forwarding performance and robust control functions. Layer 2 Ethernet switching, is expected to dominate next generation networks in the next five years. But Ethernet and packet switching in general has scalability issues owing to the amount of time needed to process every packet. Current distribution mechanisms such as the Ethernet LAG protocol split traffic across multiple links at flow granularity, but may waste resources by up to 60% in dynamic environments. This occurs because flow level granularity do not enable efficient filling of the capacity of the link.

SUMMARY

An object of the invention is to provide improved apparatus or methods. According to a first aspect, the invention provides a method of operating a packet switching node coupled by links to other nodes, as an ingress node by receiving packets belonging to a specified packet flow, to be sent on to a destination node, assembling the received packets of that flow into bursts of packets with a burst control packet indicating a sequence of the burst in the flow to enable the sequence to be maintained after transmission. The node determines whether to distribute the flow, and if the flow is to be distributed, at least two of the links are selected for sending on the bursts of this flow towards the destination node. The bursts of the flow are then distributed between the selected links by forwarding a first of the bursts for switching to a first output port, for transmission over a first of the selected links, and by forwarding another of the bursts of that flow for switching to another output port, for transmission over another of the selected links.

Distributing flow over multiple links can enable more flexible and efficient filling of allocated bandwidth on links, as traffic increases. In particular it can address the problem of having to allocate a large bandwidth on a single link, large enough for anticipated traffic increases, which can leave much of the bandwidth unused in the meantime. One obstacle to distributing traffic over different links is the risk of losing the order of packets. The burst control packet can address this by indicating the sequence of the bursts so that the sequence can be maintained after transmission. Any additional features can be added to those discussed above, and some are described in more detail below.

Another aspect of the invention can involve a corresponding method of controlling switching in a packet switching node having a local input port for receiving packets belonging to a specified packet flow, to be sent on to a destination node, a burst assembler for assembling the received packets of that flow into bursts of packets with a burst control packet indicating a sequence of the burst in the flow, to enable the sequence to be maintained after transmission. The node also has a switch coupled to the local input port and to output ports. The node determines whether to distribute the flow, and if the flow is to be distributed selects at least two of the links to use for sending on the bursts of this flow towards the destination node. The bursts of the flow are distributed between the selected links by forwarding a first of the bursts for switching to a first output port, for transmission over a first of the selected links, and forwarding another of the bursts of that flow for switching to another output port, for transmission over another of the selected links according to the indicated sequence for the flow.

Another aspect provides a corresponding method of operating a packet switching node coupled by links to other nodes, as an egress node. This involves receiving at line input ports, bursts of packets belonging to a specified packet flow, sent over different links from another node, each burst having a burst control packet, the burst control packet indicating a sequence of the burst in the flow. A local output port is selected for packets of this flow, and the different bursts are switched to the selected local output port, and the packets of the different bursts of the same flow are ordered according to the indicated sequence.

Another aspect provides a corresponding method of operating a packet switching node coupled by links to other nodes, as an intermediate node, involving receiving at line input ports, bursts of packets belonging to a specified packet flow, sent from another node, each burst having a burst control packet, the burst control packet indicating a sequence of the burst in the flow. It is then determined if the received flow is distributed, and if not distributed, a determination of whether to distribute it over different links to different adjacent nodes is made. If distributed, a determination of whether to recombine it is made. If distributed and not to be recombined, then at least two of the links are selected for sending on the bursts of this flow towards the destination node. The flow is distributed between the selected links by forwarding a first of the bursts for switching to a first output port, for transmission over a first of the selected links, and forwarding another of the bursts of that flow for switching to another output port, for transmission over another of the selected links in order according to the indicated sequence for the flow.

Another aspect provides a corresponding computer program for operating a node or controlling a switching.

Another aspect provides a traffic controller for a controlling a packet switching node coupled by links to other nodes and having a local input port for receiving packets belonging to a specified packet flow, to be sent on to a destination node, and a burst assembler for assembling the received packets of that flow into bursts of packets, each burst having a burst control packet, the burst control packet indicating a sequence of the burst in the flow, to enable the sequence to be maintained after transmission. The node also has a switch coupled to the local input port and to output ports. The traffic controller can select at least two of the links to use for sending on the bursts of this flow towards the destination node. The traffic controller is being coupled to the burst assembler to distribute the flow between the selected links by forwarding a first of the bursts from a burst assembler queue to the switch for switching to a first output port, for transmission over a first of the selected links, and by forwarding another of the bursts of that flow from another burst assembler queue to the switch for switching to another output port, for transmission over another of the selected links Another aspect provides a packet switching node having such a traffic controller.

Any of the additional features can be combined together and combined with any of the aspects, or disclaimed from the aspects. Other advantages will be apparent to those skilled in the art, especially over other prior art. Numerous variations and modifications can be made without departing from the claims of the present invention. Therefore, it should be clearly understood that the form of the present invention is illustrative only and is not intended to limit the scope of the present invention.

BRIEF DESCRIPTION OF THE DRAWINGS

How the present invention may be put into effect will now be described by way of example with reference to the appended drawings, in which:

FIG. 14 shows a schematic view of a node including logical operations of a traffic manager according to an embodiment, and FIG. 15 shows a flow chart of a Request-Acknowledge Grant mechanism for ordering and scheduling of bursts according to an embodiment.

DETAILED DESCRIPTION

Figure 1:
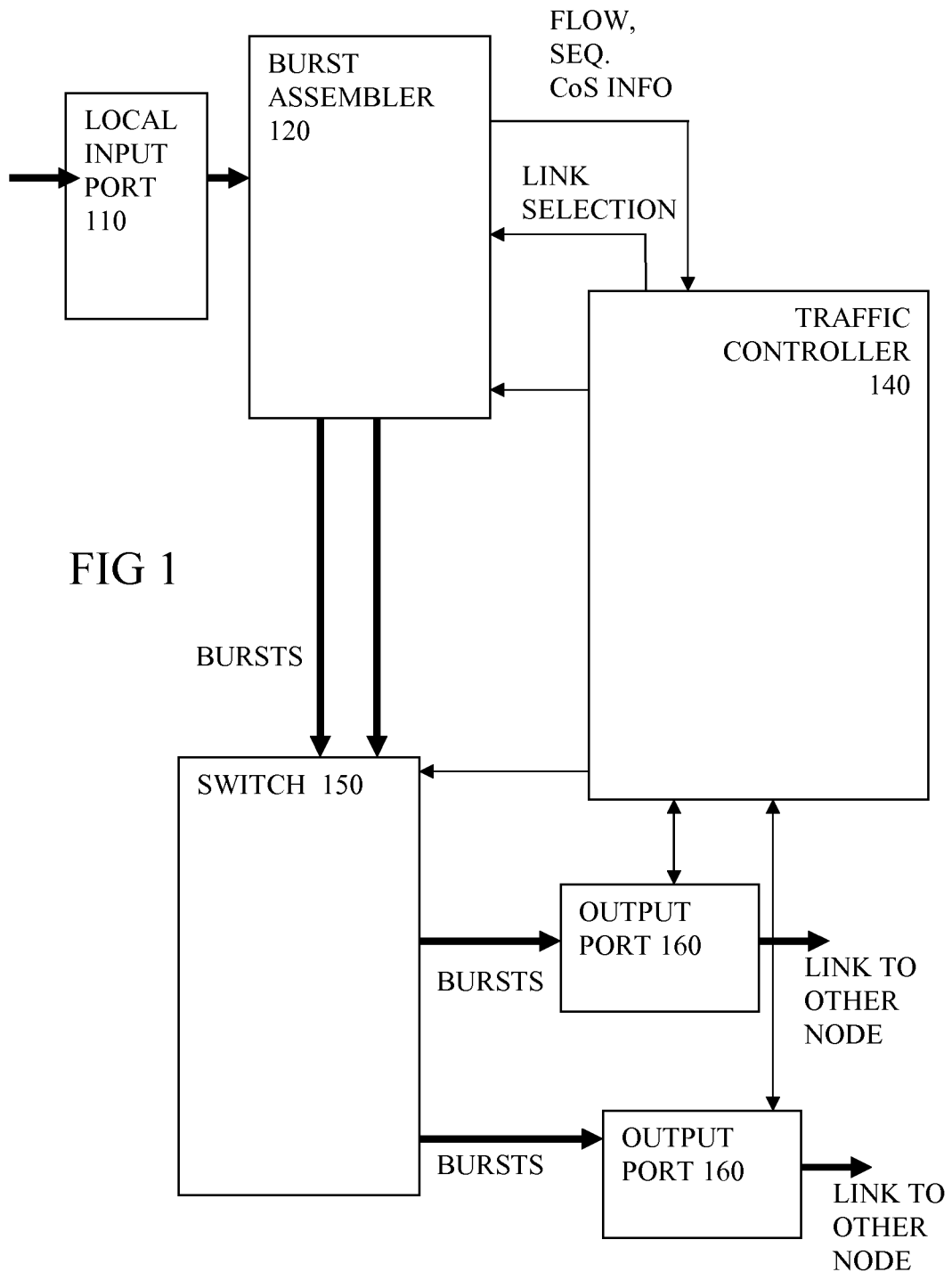
FIG. 1 shows a schematic view of a node according to a first embodiment.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Definitions

Where the term "comprising" is used in the present description and claims, it does not exclude other elements or steps. Where an indefinite or definite article is used when referring to a singular noun e.g. "a" or "an", "the", this includes a plural of that noun unless something else is specifically stated.

The term "comprising", used in the claims, should not be interpreted as being restricted to the means listed thereafter; it does not exclude other elements or steps.

Elements or parts of the described nodes or networks may comprise logic encoded in media for performing any kind of information processing. Logic may comprise software encoded in a disk or other computer-readable medium and/or instructions encoded in an application specific integrated circuit (ASIC), field programmable gate array (FPGA), or other processor or hardware.

References to switching nodes can encompass any kind of switching node, not limited to the types described, not limited to any level of integration, or size or bandwidth or bit rate and so on.

References to software can encompass any type of programs in any language executable directly or indirectly on processing hardware.

References to hardware, processing hardware or circuitry can encompass any kind of logic or analog circuitry, integrated to any degree, and not limited to general purpose processors, digital signal processors, ASICs, FPGAs, discrete components or logic and so on.

Introduction to the Embodiments

By way of introduction to the embodiments, some issues will be explained. A dynamic load balancing and scheduling mechanism for a packet switching node, such as an Ethernet transport node, is described, for use where transmission is structured in bursts. Bursts are groups of consecutive packets belonging to the same flow (for example with the same CoS and the same source and destination metro transport nodes) preceded by a burst control packet carrying information necessary for burst packets classification and forwarding.

Figure 8:
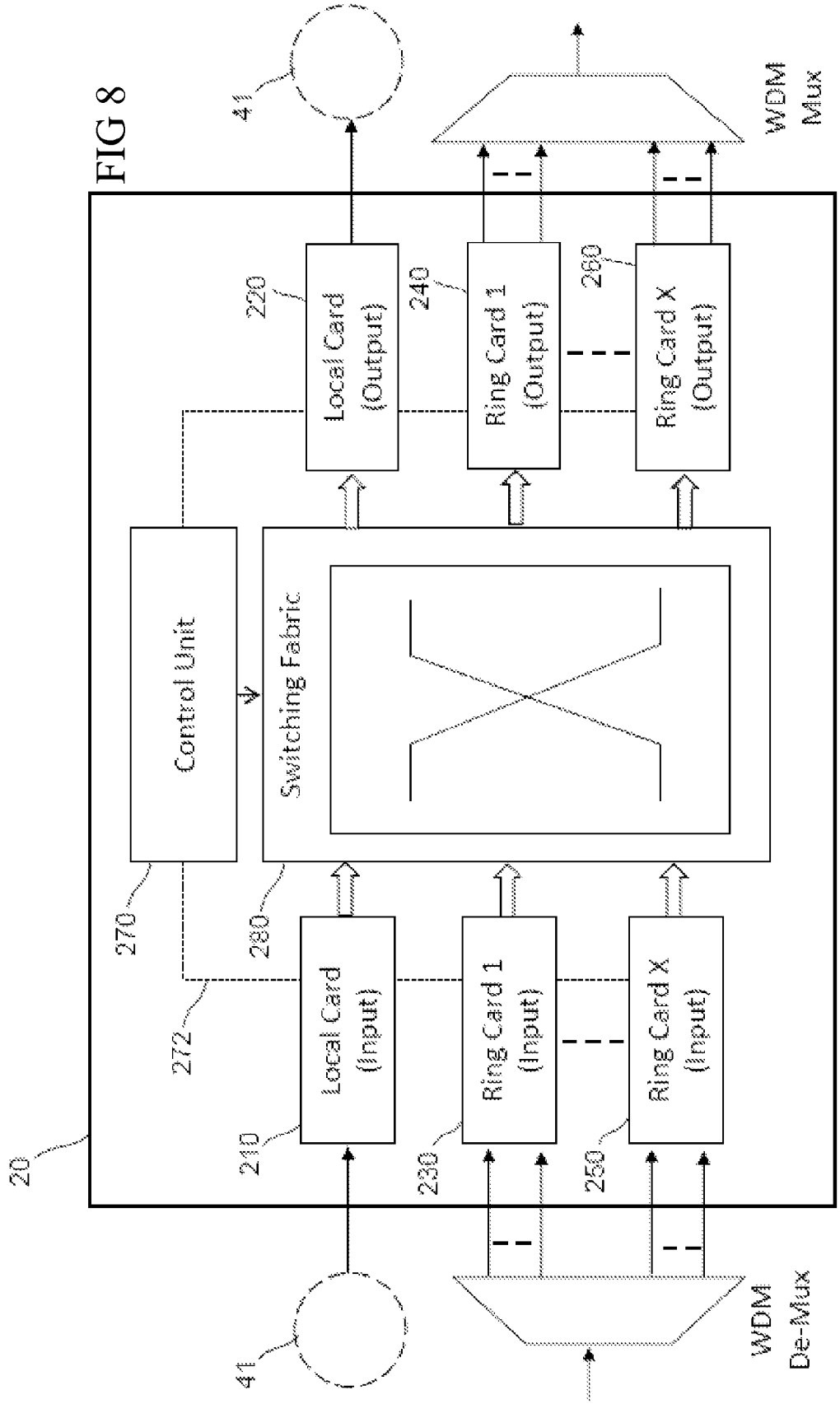
FIG. 8 shows a schematic view of a node according to an embodiment.

Each Ethernet transport node, as shown in FIG. 8, is characterized by line cards with input/output ports connected to the node's local networks (let's call them "local cards") and by line cards with input/output ports connected to other nodes on the ring (let's call them "ring cards").

Each node is assumed to know the network bandwidth available for its local traffic and more specifically the output channels/wavelengths and their percentage allocated to it. Such information (let's call it "channel allocation matrix") is provided through a management plane or determined through a distributed control protocol on the basis of flows service level agreements that the different nodes need to support.

Some embodiments of the present invention can provide traffic management for a packet switch such as an Ethernet switch aiming at supporting different Classes of Services and load balancing across multiple links to improve bandwidth utilization. A dynamic distribution mechanism enables nodes to split a flow of packets across different output ports belonging to the same or different ring cards while assuring burst transmission order.

In some examples, in each local card a link aggregation distribution algorithm determines dynamically for each flow, on the basis of the channel allocation matrix, a splitting vector ($P_{1-Flowi}, \ldots P_{M-Flowi}$, where M is the number of ring cards) indicating the percentages P of the flow to be split across the different ring cards. The distribution algorithm determines the splitting vector so as to minimize the number of cards across which to split a flow.

FIG. 1, Node According to a First Embodiment

In the embodiment of FIG. 1, a number of features of a node are shown schematically. There can be many other features not shown. A local input port 110 is coupled to feed incoming packets from local sources to a burst assembler 120. A traffic controller 140 controls a switch 150 to switch bursts of packets from the burst assembler to output ports 160. From these output ports, packets can be passed over links to other nodes of the network. The traffic controller receives information about the incoming packets such as flow sequence and class of service information. The traffic controller can then select an output port and indicate this to the burst assembler. Timing of when the burst assembler feeds packets to the switch can be controlled by the traffic controller. The output ports can also be controlled by the traffic controller.

Figure 2:
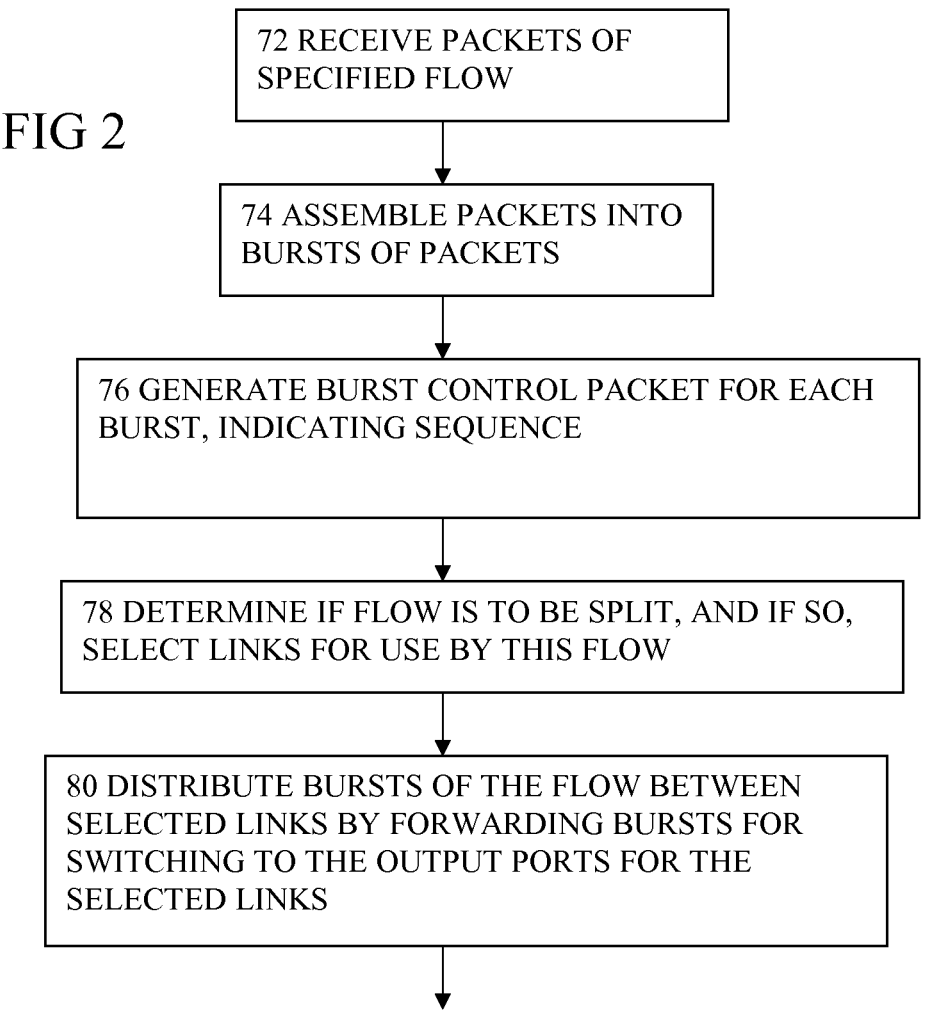
FIG. 2 shows operational steps of a node according to an embodiment.

FIG. 2 Operational Steps of a Node According to an Embodiment

In FIG. 2, some notable operational steps are shown, of a node according to an embodiment such as that of FIG. 1, or other embodiments. Many other steps can optionally be added. At step 72, packets of a specified flow are received. At step 74, packets are assembled into bursts of packets. A burst control packet is generated for each burst, indicating a sequence of the packets in the burst at step 76. Whether the flow is to be split to be distributed over several links is determined at step 78. If so, links are selected. At step 80 the bursts are distributed between the selected links by forwarding a burst for switching to an output port for a first of the selected links, and forwarding another burst for switching to another output port for another of the selected links.

Additional Features of some Embodiments:

According to some embodiments, transmission of bursts of the different "add" and "transit" flows are arbitrated by a distributed scheduling strategy on the basis of their QoS requirements. In some examples described, a simple request-grant mechanism is provided to handle transmission on aggregated links by assuring ordering of bursts of a same flow. A request for a burst transmission is issued by the ingress card if the accumulated tokens of the relevant flow are enough and if it has received the acknowledgement that the previous burst has been transmitted.

Output card schedulers issue grants on the basis of bursts' CoS and available bandwidth. The grant is sent to all cards among which the flow has been split. The card with the burst having the sequence number and flowID specified in the grant message will transmit the burst, the others will update the current sequence number variable of the flow.

The schedulers also distribute bursts among output ports of the same card or a group of them by assigning the current served burst to the output port with the minimum size. In this way the buffering and reordering process delay is minimized.

The traffic manager can show more agility in reacting to changes in flows and can be more scalable by having a relatively simple queuing architecture and control signaling. This enables the load balancing problem in Ethernet switches to be tackled without an undue increase in complexity of the traffic manager. The traffic manager of conventional switches is generally characterized by an output scheduler with a hierarchical structure allocating credits to input queues/flows whose transmission is then arbitrated by an additional input scheduler.

If the packets are Ethernet packets, and the burst control packet is an Ethernet packet, this is particularly useful since Ethernet is commercially widely used, and does not easily allow an indication of sequence. It can enable more efficient burst transmissions without modifying basic Ethernet functionalities.

Figure 4:
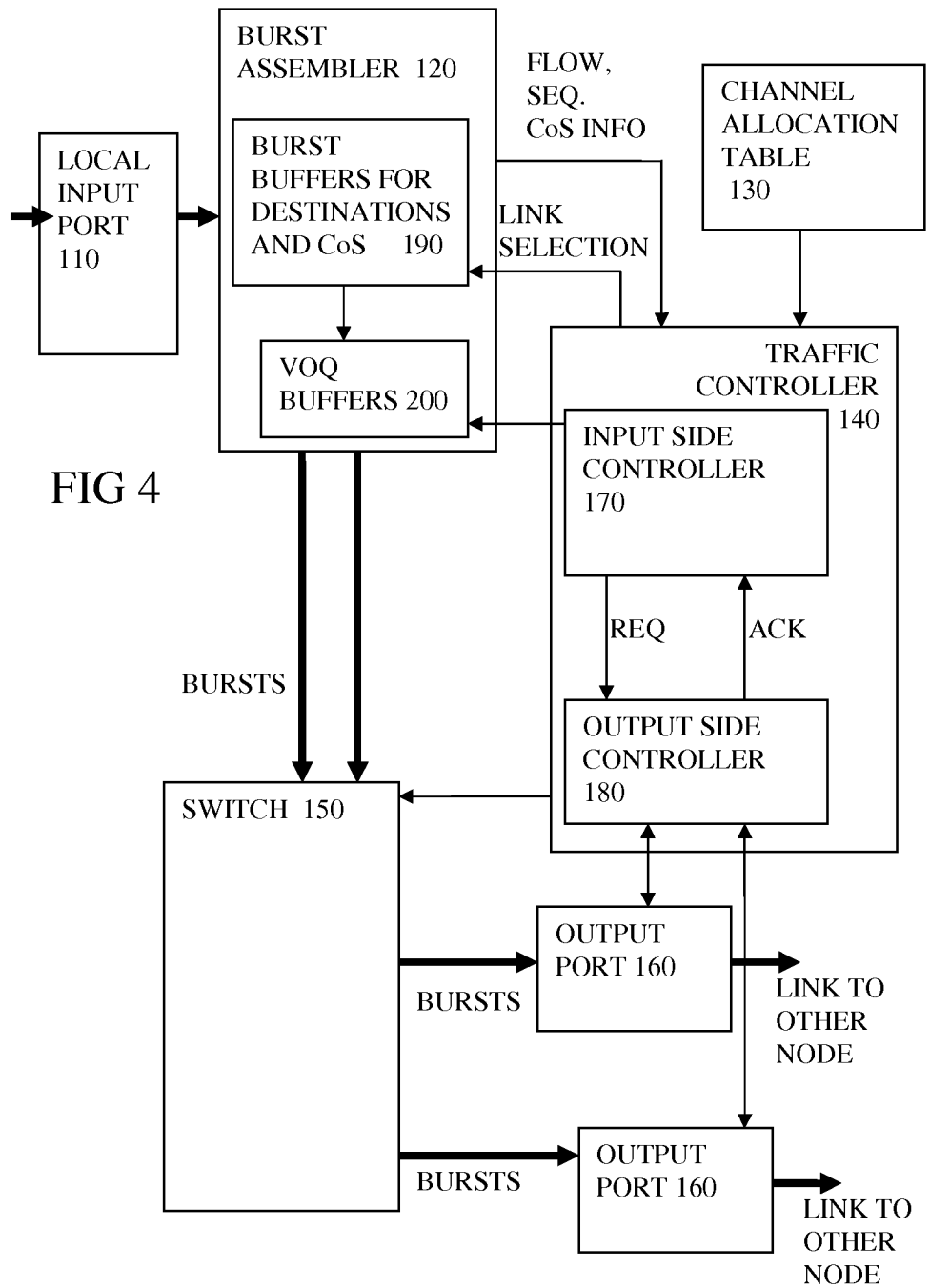
FIG. 4 shows a schematic view of a node according to an embodiment.

FIG. 4 shows a schematic view of a node according to an embodiment. The node can have at least two buffers (200) for queueing the bursts before switching, each of the buffers being associated with at least one of the output ports, the method having the step of queueing the bursts in whichever of said buffers corresponds to their selected output port. This means the switching can be delayed if there is congestion at the output ports for example, without holding up processing of further received packets. Also it can enable the order of switching of different bursts to be controlled more easily, by controlling output from the queues.

The node can have a channel allocation table (130) indicating allowed bandwidth (on the basis of the service level agreement of the flow) on each of the links, for the flow, and the distributing step can comprise determining what proportion of a total bandwidth needed for the flow, is to be distributed to each of the selected links, based on the channel allocation table. This can enable more even filling of the allocations on the different links. This is particularly useful if a flow capacity/bandwidth is lower than single link capacity, since otherwise the excess capacity of the link is wasted and cannot be used by another flow. And it can enable more efficient transmission if congested links can be avoided for example. There is a further benefit in that flows which exceed the capacity of a single link need not be rejected, as they can be split to enable them to be served.

The method can have the step of controlling when the bursts are forwarded by sending a switch request for a given burst to an output controller (180) for its selected output port, and forwarding the burst for switching when the output controller sends an acknowledgement to allow the switching. This can enable the output controller to manage the traffic using that output port to improve efficiency of use of the link.

The sending of the acknowledgement can be dependent on the preceding burst in the sequence having been acknowledged. This can maintain the order at least temporarily if there is no available output bandwidth for a period.

The method can have the step of controlling when the bursts are forwarded according to the indication of the sequence of the bursts of a given flow. This can help avoid lengthy queueing downstream if bursts are allowed to get out of order. Such burst forwarding control can help assure that consecutive bursts of the same flow are served in order; this can reduce queuing delay at the receiver in case consecutive packets arrive out of order. This could occur due to the different size of the bursts and/or to different output queue congestion status. Hence transmission efficiency can be improved.

The method can have the step of controlling when the bursts are forwarded according to a rate limit for the flow for the link. This can help reduce congestion in the switch, or in the output ports, and so contribute to transmission efficiency. (This can help provide more assurance that a flow service level agreement will be respected and thus reduce a risk of affecting performance of other flows).

The flow can have a specified class of service, and the step of controlling when the bursts are forwarded can be made according to the class of service of the flow.

The flow can have a specified class of service, and the distributing step can be made according to the class of service of the flow. This can enable prioritisation of flows having a higher class of service for example.

Figure 7:
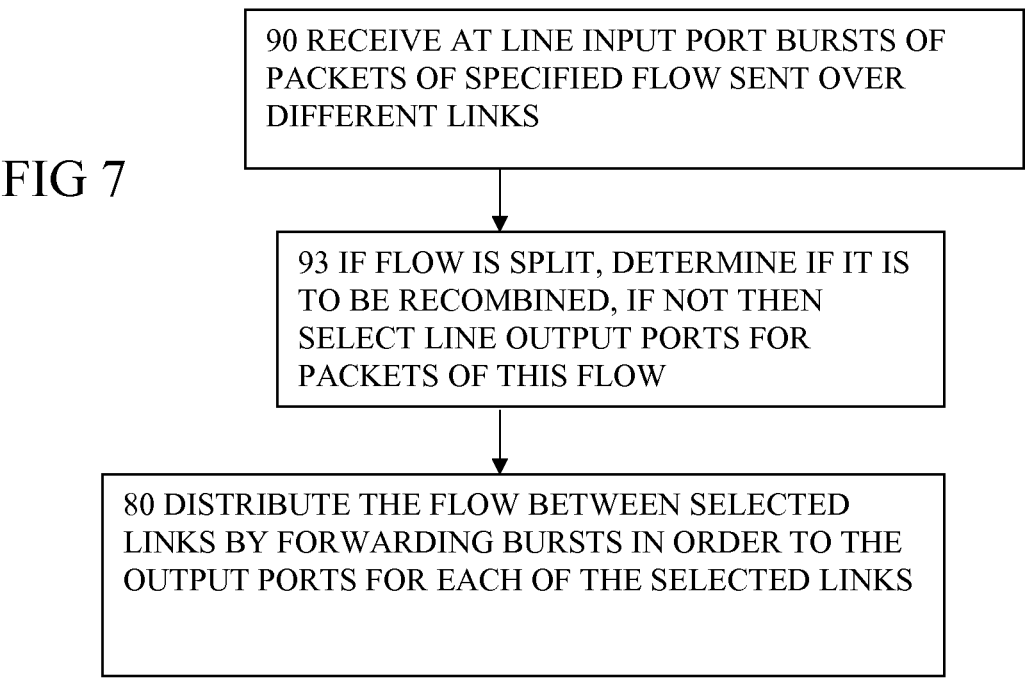
FIG. 7 shows operational steps of an embodiment operating as an intermediate node.

Various examples of traffic managers proposed for Ethernet transport nodes are described in the following. The switch architecture in the FIG. 7 is taken as a reference.

In some embodiments, a burst-based mechanism for distribution of "add" traffic (coming from local cards) across output ring ports and a scheduling strategy arbitrating burst transmission while guaranteeing QoS requirements is shown.

Figure 3:
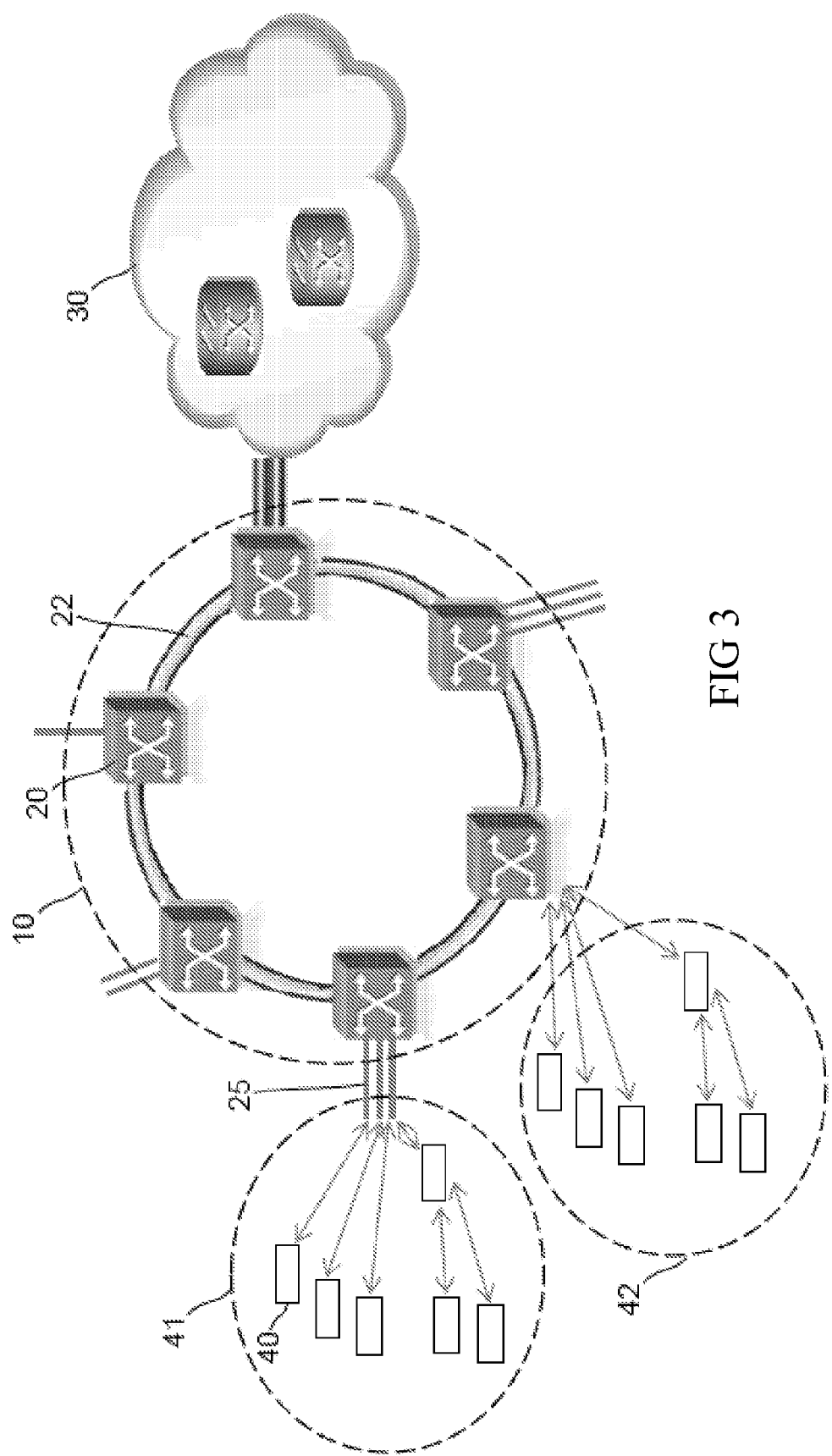
FIG. 3 shows a network view.

FIG. 3, Network View

Embodiments can be applied to the example of a metro network having a ring physical topology on which Ethernet switches are connected through multiple channels/Ethernet links. The multiple Ethernet links may be WDM multiplexed over one or more optical fibers. The use of WDM is justified by high capacity requirements of next generation transport network dictated by the need to support new high-capacity services such as HD-IPTV.

FIG. 3 shows an example of a communication network 10 having nodes 20 in accordance with an embodiment of the present invention. The network 10 has a ring topology, although the network 10 can have other topologies, such as a mesh topology, or interconnected rings for example. The network 10 has a packet-based transport layer and nodes 20 forward (switch) packets between input and output ports of the node based on an address carried in a header of each packet. In FIG. 3 the network 10 is a metro network with nodes 20 connecting 25 to access networks 41, 42. Metro network 10 also connects to other metro networks/core networks 30. The physical layer connecting nodes 20 in network 10 is optical, and typically the links 22 between network nodes 20 are wavelength division multiplexed (WDM), or dense wavelength division multiplexed (DWDM), optical links with a set of wavelength channels carried over one or more optical fibres.

FIG. 4, Schematic View of a Node

FIG. 4 shows another embodiment of a node, similar to that of FIG. 1, with some additional features. The burst assembler has two levels of buffering, a first level of buffers 190 with separate queues for different destination nodes, and optionally for different levels of class of service. A second level of buffering is shown by the VOQ (virtual output queue) buffers 200. Further details of such buffers are explained below with reference to FIGS. 10 and 12 at least.

In FIG. 4, the traffic controller has an input side controller 170, and an output side controller 180. These parts cooperate using requests and acknowledge signals so that the bursts are input to the switch only if the relevant output port is ready and not overloaded. In FIG. 4 a channel allocation table 130 is shown for use by the traffic controller. This can be used to store information to enable the node to decide whether to split or recombine the flows. Such information can include which links can lead to the same destination, a current occupancy of such links, an allowable bandwidth for a given flow as set by a service level agreement for example.

Figure 5:
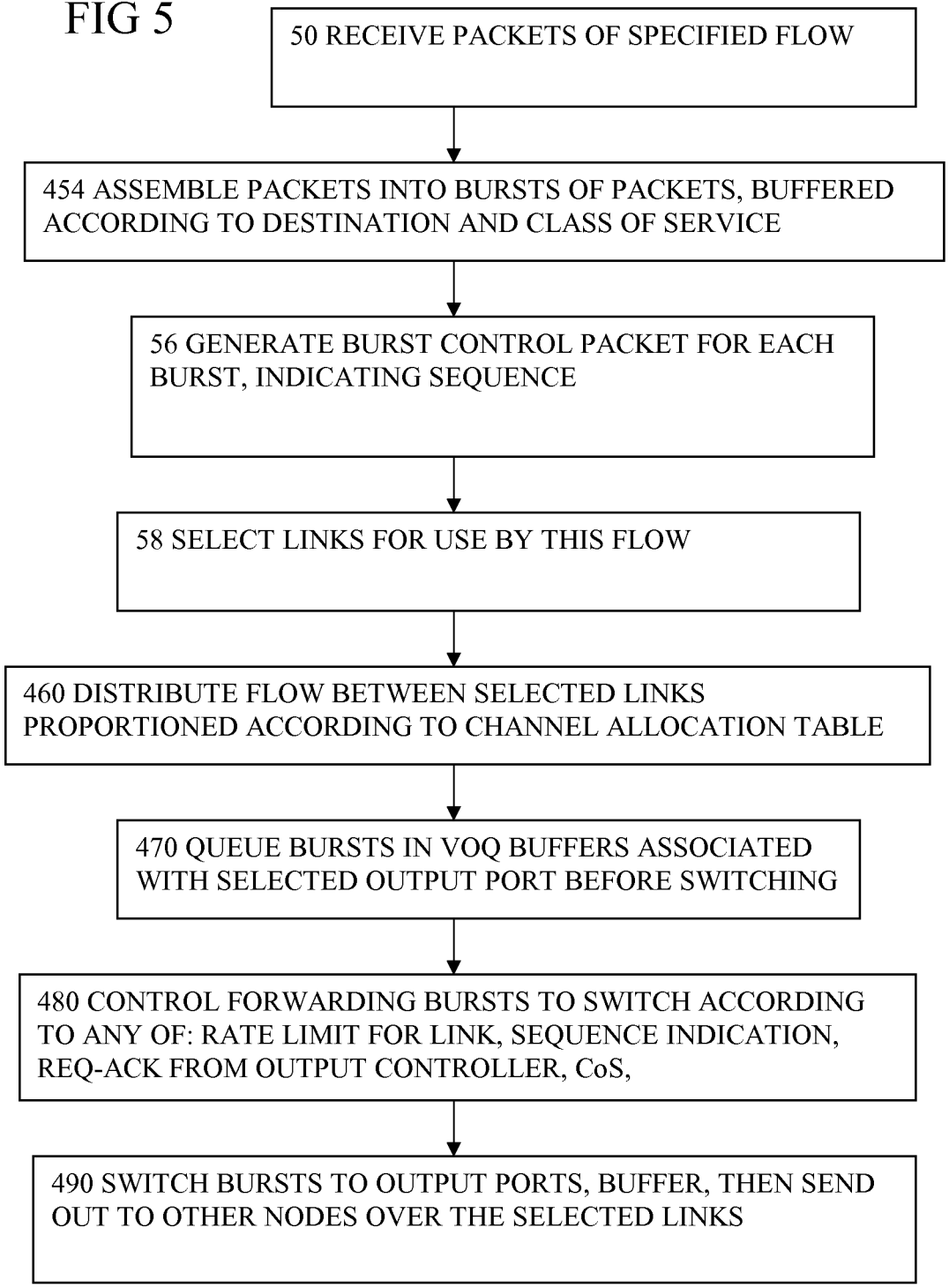
FIG. 5 shows operation steps of an embodiment operating as an ingress node.

FIG. 5, Operation Steps of an Embodiment Operating as an Ingress Node

In the embodiment of FIG. 5, packets of a specified flow are received at step 50. They are assembled into bursts of packets buffered according to class of service CoS at step 454. A burst control packet is generated at step 56 for each burst, indicating a sequence number. At step 58 outgoing links to be used for this flow are selected. The flow is distributed between these selected links in proportions determined according to the information in the channel allocation table at step 460. At step 470 the bursts to be switched are queued in virtual output queues associated with the selected output ports before being forwarded for switching. The forwarding to the switch is controlled at step 480 according to one or more factor such as a rate limit for the link, a sequence number indicated for the burst, a CoS, or whether the output side controller has acknowledged a request to send from the input side, to indicate the output side is ready. The switch the switches the burst to the selected output port at step 490, where the burst is buffered before being sent on to other nodes over the selected link. The same process is carried out for the other bursts being sent to other output ports.

Figure 6:
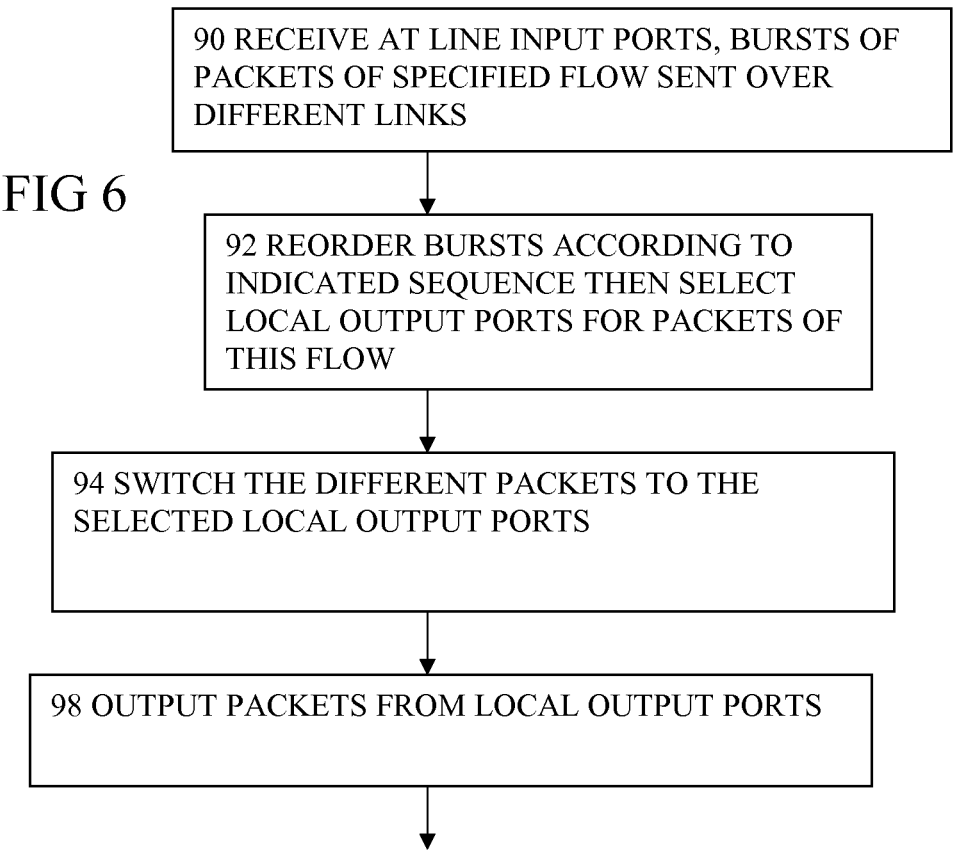
FIG. 6, shows operational steps of an embodiment operating as an egress node.

FIG. 6, Operational Steps of an Embodiment Operating as an Egress Node

FIG. 6 shows some steps similar to those of the embodiment of FIG. 2, but in this case, the node is operating as an egress node. At step 90, at line input ports, bursts of packets of a specified flow sent over different links are received. At step 92, these bursts are reordered according to the indicated sequence. Then one or more local output ports can be selected for the flow. At step 94 the different bursts of the flow are switched to the selected local output ports, in order. At step 98, the packets of the recombined burst are output from the local ports.

FIG. 7, Operational Steps of an Embodiment Operating as an Intermediate Node

FIG. 7 shows some steps similar to those of the embodiment of FIG. 2, but in this case, the node is operating as an intermediate node. In a general case the intermediate node can decide whether to split the flow again, or for instance to recombine and transmit the received split flow on a single output link. The splitting decision is a local decision for each node to decide dynamically where to forward each incoming set of bursts. At step 90, at line input ports, bursts of packets of a specified flow sent over different links are received. At step 93, if the flow arrives across several links, the node determines if the flow is to be recombined. If not, then the node selects line output ports for packets of this flow. At step 80, the flow is distributed between selected links by forwarding bursts in order to the output ports for each of the selected links.

In some cases the decision of whether to split or recombine can be made according to locally held information, for example a channel allocation table can store which are the links that are aggregated in the sense of enabling the flow to be split and reach the same destination (by respecting order and token bucket policy).

On each node the number of bundled channel on the path could be different, and in general the bit-rate at which input and output links operates could be also different. Considering those kinds of information a splitting vector is computed on each node, thus allowing the splitting ratio for a flow to vary on each node.

FIG. 8, Schematic View of a Node

FIG. 8 shows an overview of apparatus at one of the transport nodes 20. With reference to the metro network scenario of FIG. 3, each transport node 20 has a set of line cards, each having an input section 210, 230, 250 and an output section 220., 240, 260. One or more of the line cards connect to local networks 41, 42. Ports in the input and output sections 210, 220 of a line card connect to links to the local network 41 served by the node 20. The node 20 can connect to multiple local networks 41, 42. The line cards connected to local networks 41, 42 will be called local cards. Each transport node 20 also has line cards each having an input section 230, 250 and an output section 240, 260 with ports connected to other nodes 20 on the ring. These will be called ring cards. Nodes 20 in the network 10 can also connect to other metro/core networks, and the node can have line cards (not shown) for connecting to the other metro/core networks.

Figure 9:
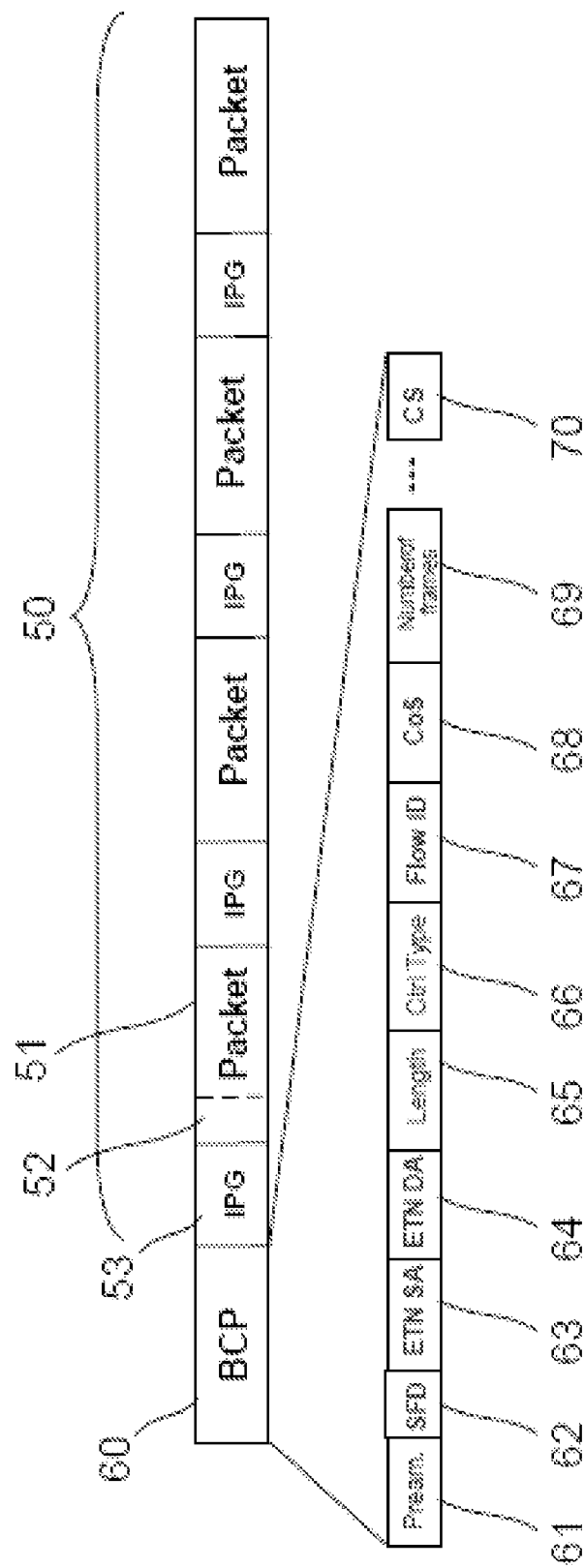
FIG. 9 shows structure of a burst of packets.

FIG. 9, Structure of a Burst of Packets

Before explaining the line cards in more detail, the format of a burst of packets is shown in FIG. 9. A burst 50 comprises at least two packets or frames 51. The format of each packet 51 is conventional, such as an Ethernet frame. The number of packets in the burst 50 can be any number having a value greater than two, although advantageously is a large number. The size of a burst will depend on factors such as delay and jitter requirements of the specific traffic flow. Advantageously, the number of packets in each burst is variable, i.e. each burst created in the network does not have to consist of the same number of packets. A burst 50 of packets is preceded by a burst control packet (BCP) 60. The burst control packet 60 travels along the same optical channel as packets 51. An example format of the burst control packet 60 is shown in FIG. 9. In this example the burst control packet 60 has the Ethernet frame format, and includes a preamble 61 start frame delimiter (SFD) and a check sequence 70 which allows a MAC Ethernet de-framer to process the packet. The burst control packet 60 comprises a source address 63, a destination address 64 and a field 69 indicating the number of packets in the burst. Optionally, the gap between each packet can include an inter-packet gap 53 which is coded in a distinctive manner. The inter-packet gap 53 signals to a node 20 that the packet preceding the inter-packet gap 53 and the packet following the inter-packet gap 53 form part of the same burst of packets. Advantageously, a burst 50 has a burst control packet 60 and an inter-packet gap 53 between each packet 51. The source address 63 and destination address 64 refer to nodes on the transport network 10, i.e. to a source node 20 on network 10 where the burst was created and to a destination node 20 on network 10 where the burst should be delivered. Other fields within the burst control packet 60 include: a preamble 61; a start frame delimiter (SFD) 62; a length field 65) and a Control type field 66. For a standard Ethernet control frame the length field can be used to indicate the protocol control type, i.e. identifies the burst control packet, and so the subsequent control type field is not necessary. Both the length field 65 and control type field 66 are present in the header of the control packet 60 if a proprietary control packet (i.e. not Ethernet) is used. The Control type field 66 signals that the packet 60 is a burst control packet. A Flow ID field 67 identifies a traffic flow within a flow generally defined by the triple: source transport node, destination transport node and Class of Service (CoS). It is useful in cases where it is required to differentiate multiple traffic flows between the same transport node SA and transport node DA and with the same CoS. The burst control packet 60 also includes a Check Sequence (CS) 70 for the contents of the burst control packet, and allows a receiving node to check if the BCP has been corrupted during transmission.

Any node 20 in network 10 which has a number of waiting packets to send to the same destination node 20 on the transport network 10 can form a burst and send the burst across the network 10. A burst is formed by creating a burst control packet 60 and sending the burst control packet 60 immediately before the burst of packets. The burst of packets are sent contiguously in time. Advantageously, the inter-packet gap between each packet of the burst is coded in a distinctive manner, using a pattern of idle bits. Ethernet standard IEEE 802.3 defines that Ethernet frames must be separated by an inter frame gap with minimum size of 96 bit time. The inter-packet gap can be coded using any suitable bit pattern which is known by sending and receiving nodes.

At a subsequent node 20 along the path of the burst of packets, a node 20 can inspect the burst control packet 60 to determine where the burst of packets needs to be forwarded, without inspecting headers of individual packets.

Figure 10:
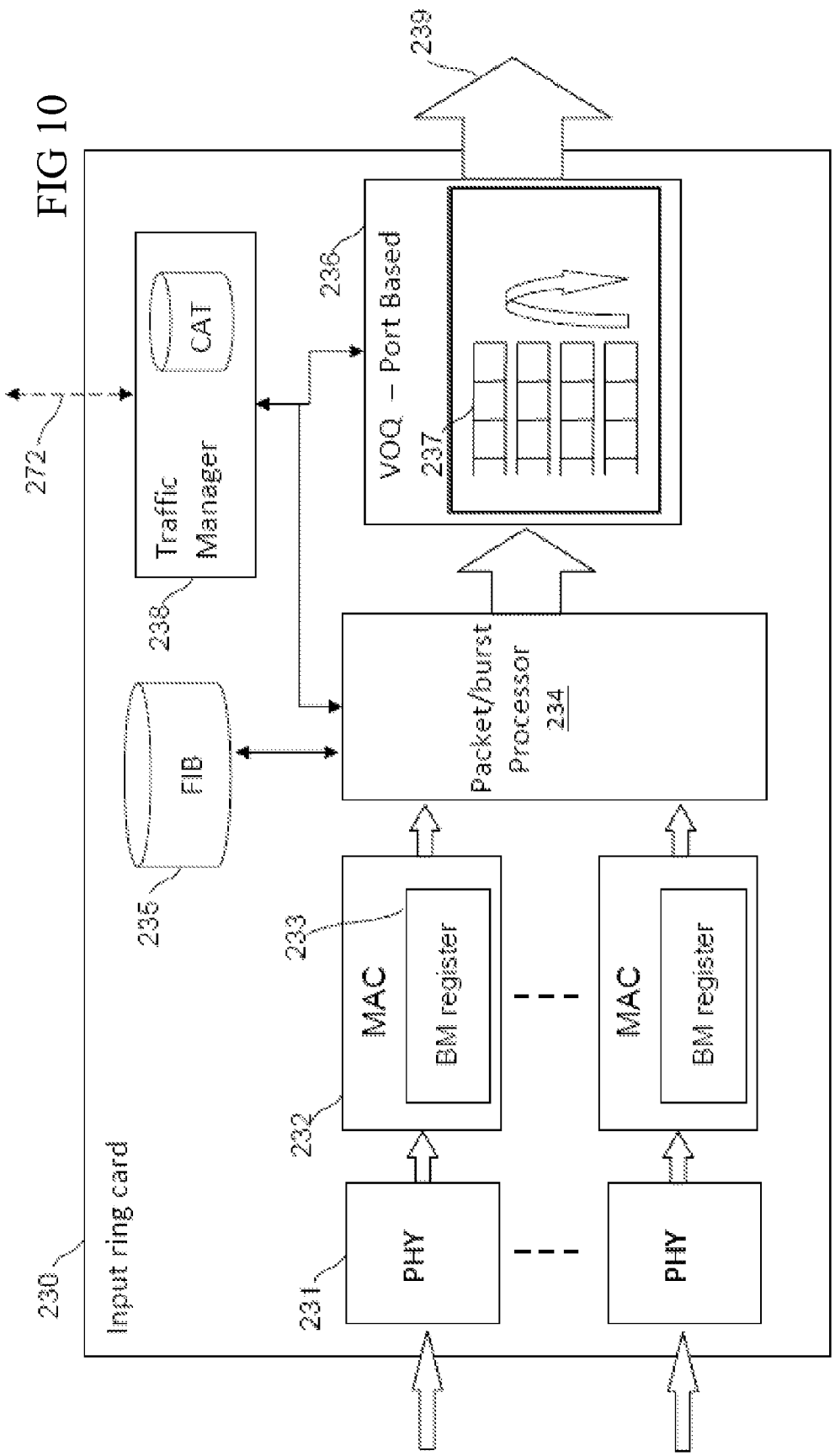
FIG. 10 shows an input ring card.

FIG. 10, Input Ring Card

FIG. 10 shows an input ring card or an input section 230 of a ring card. The line card has a set of input ports, which each receive an input from a wavelength demultiplexer. Each input port corresponds to an optical wavelength channel used on an optical link. Each input port has a physical layer line (PHY) interface unit 231. The line interface 231 converts the incoming optical signal from a format used on the communication link to a baseband electrical digital signal which can be used by the following stages. Unit 231 demodulates the received optical signal and also decodes the demodulated signal to remove any line coding used during transmission. The demodulated and decoded signal is forwarded to a MAC unit 232. MAC unit 232 performs a de-framing operation, identifying packets or frames in the signal generated by the physical layer interface unit 231. In a conventional manner, MAC unit 232 determines if the value carried in the check sequence field of a packet (70, FIG. 9) matches the decoded contents of the packet. Packets which do not match are discarded. The PHY unit 231 inspects the gap between packets/frames and identifies any inter-packet gap which contains distinctive signalling indicative of two adjacent packets forming part of a burst of packets. When the distinctive signalling is identified, it signals such a network status to the MAC unit 232 and the MAC unit 232 increments a Burst Mode (BM) register 233. If the BM register 233 has a value=0 then it indicates the current received packet does not form part of a burst with the previously received packet. If the BM register 233 has a non-zero value, the value indicates the number of packets in the burst.

Packets/frames are output to a packet/burst processor 234. For an individual packet, unit 234 processes the packet by looking up the destination address and the Class of Service (CoS) fields carried in the packet header 52 in a Forwarding Information Base (FIB) 235. For example, a packet received at a ring card from another node on the ring may be destined for a node on the access network 41 connected to a local line card 220 at the node 20 or may be destined for another node 20 on the ring network 10. In contrast with a conventional packet-forwarding node, node 20 does not process every packet arriving at a line card of the node 20. Processor 234 operates differently under certain conditions. Firstly, if a burst of packets is detected by processor 234 the processor does not process all of the individual headers of packets in the burst. Advantageously, the processor does not process any of the individual headers of packets in the burst if the burst control packet 60 is uncorrupted. Secondly, if a particular wavelength channel is being used as a transit channel through the node, unit 234 does not process individual packet headers on that channel. Traffic manager 238 stores a channel allocation table (CAT) which determines how traffic is allocated to wavelength channels. Information retrieved from the FIB 235 determines where an individual packet, or burst of packets, should be forwarded to. The information will indicate a particular output port of the node 20. Packets are sent to a buffer 237 of queuing unit 236. Advantageously, queuing unit 236 is a Virtual Output Queuing unit with buffers corresponding to the output ports. Packets are forwarded 239 from a buffer 237 of unit 236, across the switching fabric 280, according to instructions received from the traffic manager 238, 242. Processor 234 also inspects other fields of a packet or burst control packet, including the FlowID (67, FIG. 9) and Class of Service (CoS) field. The values of these fields will also affect the forwarding behaviour at the node, and will determine the priority given to the traffic.

In order to assemble traffic received from access networks into bursts, in the input local card traffic is first queued according its Destination transport node and CoS and then per port VOQ. In the input ring cards bursts can be segmented or concatenated according to the available bandwidth and shaping mechanisms. The input section of a ring card de-assembles bursts destined for an access network connected to that node. It also supports transit channels, described later.

An input section 210 of a local line card of the node 20 has a similar form as the input section 230 of a ring line card. Additionally, the input section of the local card assembles bursts of traffic received from an access network and so it has a two-level queuing scheme, with a first level handling packets and a second level handling bursts.

Figure 11:
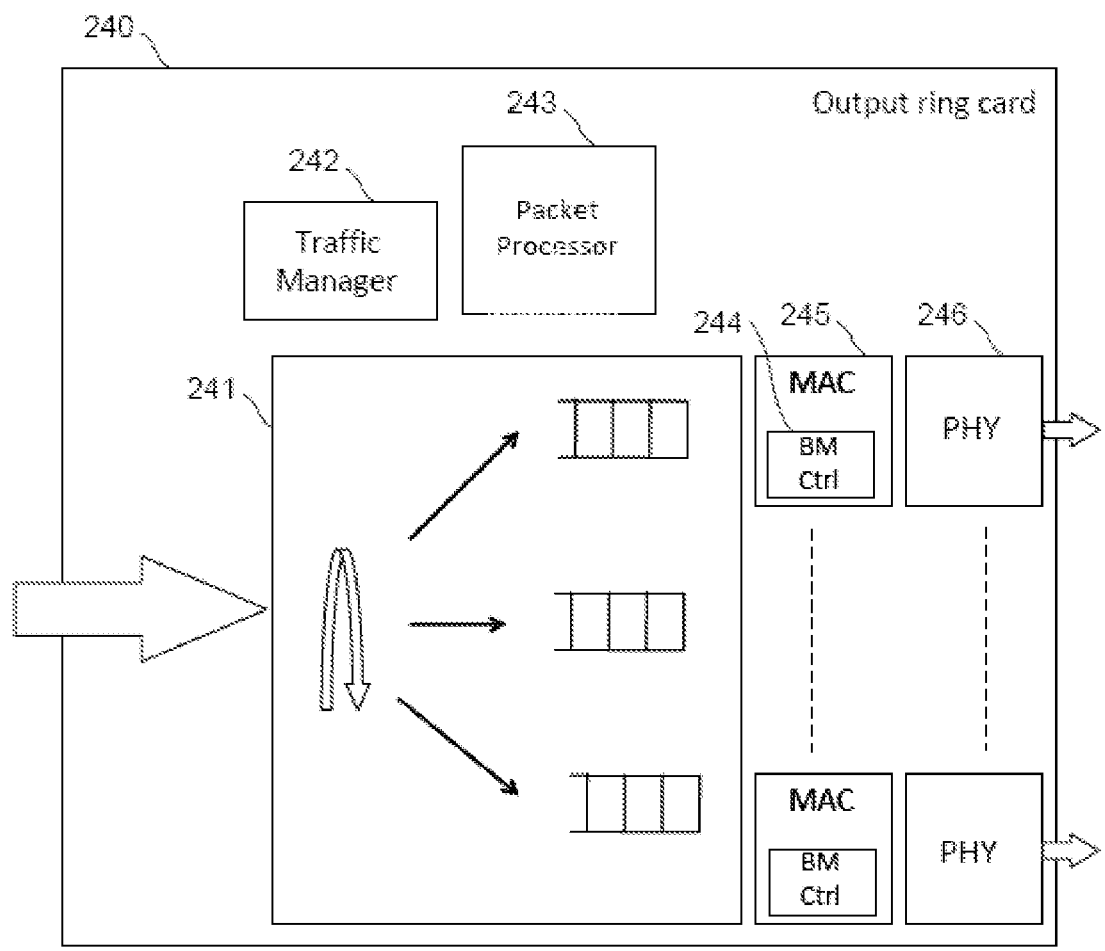
FIG. 11 shows a schematic view of an output section of a ring card.

FIG. 11, Schematic View of Output Section of an Ring Card.

Packets are received from the switching fabric by a unit 241 and buffered according to destination port. A MAC unit 245 performs a framing operation, i.e. inserting the preamble and the check sequence fields in each packet. MAC unit 245 controls the burst mode transmission. A Burst Mode Controller (BM Ctrl) 244 instructs the physical layer module PHY 246 on the beginning and the end of the burst mode transmission, and controls when the PHY unit 246 adds the distinctive bit pattern during inter-packet gaps to identify that packets form part of a burst. PHY module 246 converts the baseband electrical signal to a format (e.g. optical) used on the outgoing communication link. Typically, this comprises line coding and modulation on a wavelength channel used on an outgoing optical link. MAC unit 245 is instructed which packets form part of a group by packet processor 243.

An output section of a local line card 220 of the node 20 operates in the conventional manner of an Ethernet line card as it does not need to support management and transmission of bursts.

Packet transmission at each line card is managed by the traffic managers 238, 242. Traffic managers 238, 242 use the channel allocation table (CAT), information in the received burst control packets 60, and information about the status of the queues at each line card, which includes queue size and the type of traffic (CoS) waiting in the queues. The number of packets specified in the control packet allows the traffic manager to estimate short term load of queues at other nodes. Traffic managers 238, 242 allocate the network resources fairly to local cards and ring cards. The control unit 270 allows the line and ring cards to share the information for forwarding decisions.

Processing of packets received at a node 20 can be controlled by the packet/burst processor 234 shown in FIG. 10 as follows. A packet is received at a line card of the node, and a check is made if the packet is a burst control packet (BCP). If a burst control packet has been received, the processor inspects the information fields within the BCP. The BCP indicates the number of packets (N) in the burst and also indicates the destination address of a transport node in the network 10. A forwarding table is used to look up the destination address carried in the BCP header and determine an output line card for that destination address. The output line card can be a local line card for traffic which is being sent to an access network 41, or a ring line card for "through" traffic which is being forwarded to another node in the network. The next N packets are forwarded to the determined output line card. Packets are enqueued on the basis of destination address and CoS and are forwarded to the output line card when permitted by the traffic manager 238. This process avoids the need to process the header of each individual packet within the burst. Only the BCP header is inspected and processed, and this provides the processor 234 with all information needed to decide on a forwarding treatment for the burst of packets. In some cases the bursts can be disassembled into packets before switching. This is useful to enable conventional output local line cards to be used, which handle packets rather than bursts.

Figure 12:
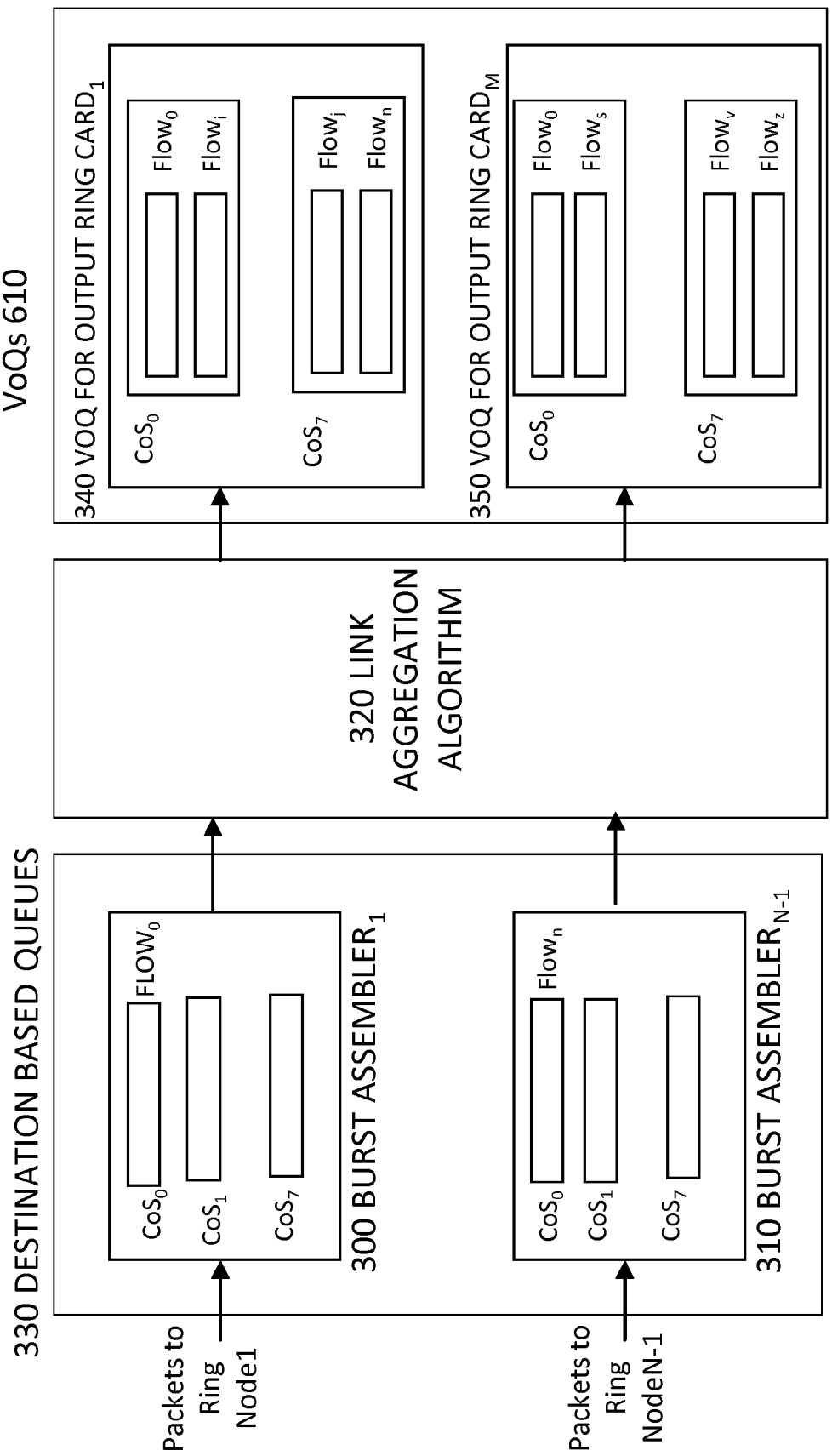
FIG. 12 shows input local card hierarchical queuing with flow splitting functionality and per output card VoQs

FIG. 12—Input Local Card Hierarchical Queuing with Flow Splitting Functionality and Per Output Card VoQs According to one possible embodiment of the invention, packets arriving at the local input card experience a two-level hierarchical queuing arrangement provided as shown in FIG. 12. This figure shows destination based queues 330, a link aggregation algorithm 320, and virtual output queues 610. They are first queued according to their destination ring node and CoS in burst assemblers 300, 310 for each of N destinations. Then they are assembled in bursts (groups of consecutive packets from the same first-level queue) and buffered in one of the M second-level queues (VOQs) determined by the link aggregation distribution algorithm. Each second-level queue is associated to one of the M output cards or a group of output ports of a same output card. For the sake of simplicity the case shown in FIG. 12, where only per output card VoQs are present, is considered in the following description of this particular embodiment. Two of the M VOQs 340 and 350 are shown.

Bursts of the same flow (with the same CoS and the same source and destination ring nodes) are allowed to be split among different output links, even belonging to different ring cards if necessary. The Flow0 in the FIG. 12 experiencing splitting across two different ring cards has two associated second-level queues, one for each output ring card. The link aggregation algorithm can distribute bursts among the output ring cards according to a splitting vector determined on the basis of their output ports' load so as to optimize utilization of multiple aggregated links A token bucket control mechanism is optionally used as one way of assuring an agreed rate associated to each flow/subflow (second-level queue). Tokens are generated on the basis of flow/subflow service attributes (such as committed bandwidth) and removed from the bucket when packets are sent to the output card. The size of bursts can be determined on the basis of the token bucket balance of the relevant flow/subflow.

Each burst consists of a group of data packets preceded by an Ethernet burst control packet helping to distinguish bursts in the queues. As described above, a burst control packet carries the MAC Addresses of the Source and Destination Ring Node and CoS in the header, and additional fields such as the number of packets in the burst and the burst sequence number in the payload.

Control packets of the bursts at the head of the queues are processed by the ingress forwarding engine that issues "request to send" messages to the corresponding output schedulers. A "request to send" message for a given burst is issued if its associated token bucket has accumulated enough tokens and if its previous burst has received the permit to be transmitted.

Figure 13:
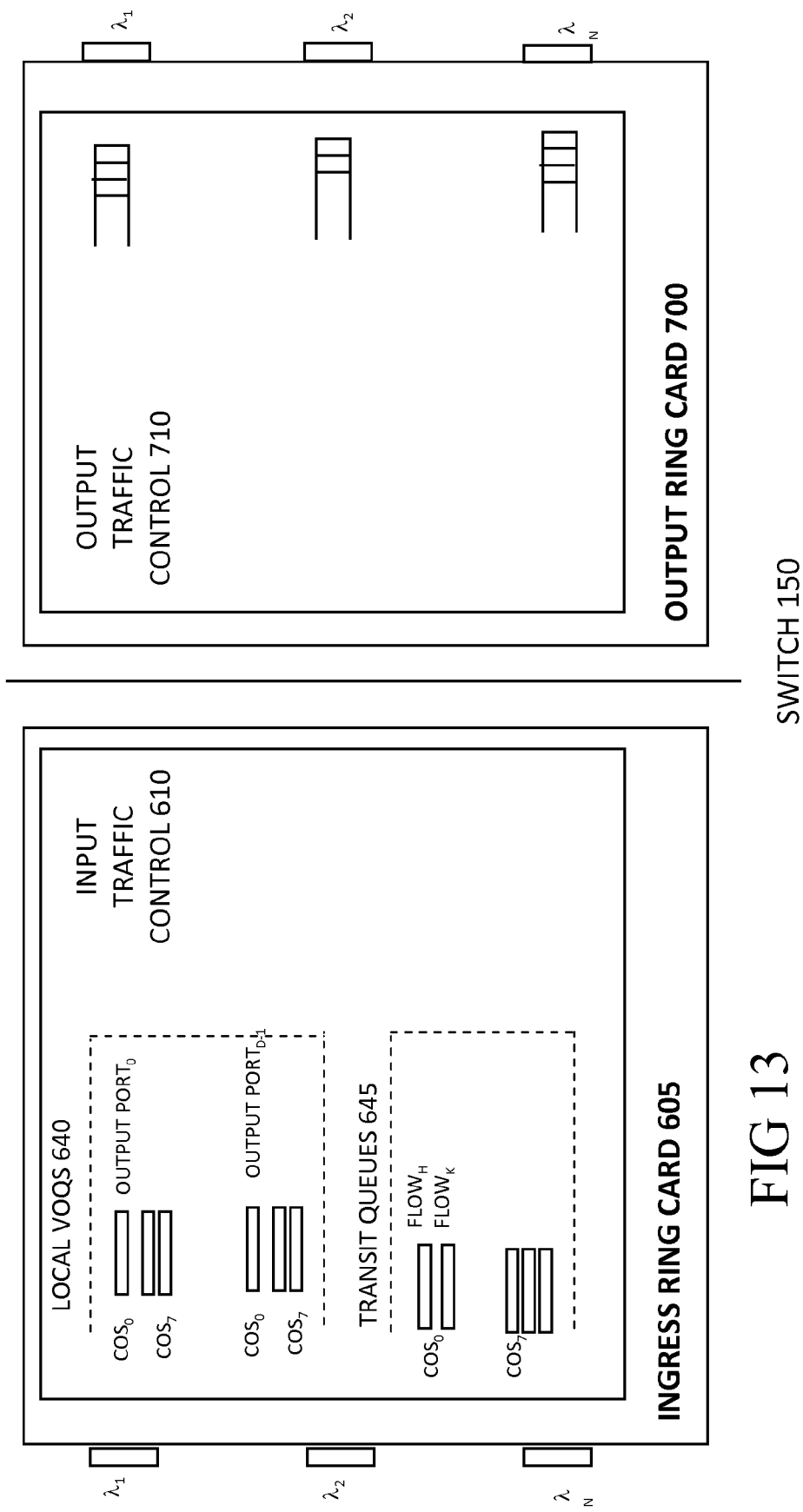
FIG. 13 shows an ingress ring card and output ring card queueing structure

FIG. 13, Ingress Ring Card and Output Ring Card Queueing Structure

FIG. 13 shows some parts of a node, with other parts omitted for clarity, to show an example of some of the queueing structure. It shows one of the input ring cards 605, one of the output ring cards 700, and a switch 150. In the ring card input packets are queued in transit queues 645 or drop buffers called local VOQs, according to the destination node address contained in their corresponding burst control packet. DxP drop Virtual Output Queues (VoQs) with burst re-ordering functionality are supported per ring card, where D is the number of local output ports and P is the number of CoSs. In the case of a ring network, transit flows are assumed to experience local switching (i.e. are forwarded on output ports of the same card). Consequently a transit queue for each flow/subflow is supported per input ring card. Moreover a single queue per output port is assumed.

An ingress traffic engine processes arriving control packets and sends the corresponding "request to send" messages to the output ring card so as to assure burst ordering and the agreed load. The "request to send" message specifies the burst flow identifier, sequence number and priority.

On each output card a scheduler mechanism distributes the output ports bandwidth among its associated flows, giving permits to transmit to the bursts for which it has received the requests to send on the basis of their QoS requirements.

FIG. 14 Schematic View of Node Including Logical Operations of Traffic Manager

FIG. 14 shows some parts of a node, with other parts omitted for clarity, to show an example of some parts and signals involved in the traffic control. The figure shows one of the local ingress cards 600, an ingress ring card 605, and two of the output ring cards 700. The ingress local card has an input part of the traffic controller 610, which includes a processor 620 and a store for token buckets 630. VOQs 640 are shown as described above, feeding a packet handler 650 for forwarding packets under control of the traffic controller.

In the output ring card, an output part of the traffic controller 710 has a processor 720 and a scheduler part 715. These control a packet processor part 730 which includes the output buffer 740. The processor of the input part can forward packets for switching only after a request to send message has been acknowledged by the scheduler at the appropriate output ring card.

In order to assure packet ordering, every time the output scheduler grants a permit to transmit a burst, an ack message, containing the flow ID and the burst sequence number, is sent to all output ring cards on which the flow has been split (as shown in FIG. 14). This is done because the request and the acknowledge for the burst having the next sequence number will await this grant of the permit. If it waits beyond a timeout, the request and acknowledge can be sent out of order, and the bursts can be reordered at the next node.

The ring card that issued the request for that burst (the burst with the flow ID and sequence number specified in the ack message) starts sending it to the corresponding output card. All the involved ring cards increment the "current burst sequence number" variable of the specified flow ID. The card having received the control packet of the successive burst sends a "request to send" message to the destination card, if its token balance allows it.

If a timeout, started at the burst arrival, expires before the reception of the ack message related to the previous burst and the token balance is above the burst length, the request is forwarded. The timeout for each flow is set so as to assure no mis-ordering of bursts.

FIG. 15 Flow Chart of Request-Grant Mechanism for Ordering and Scheduling of Bursts FIG. 15 shows operations performed by the input traffic manager at the reception of each burst control "CTRL" frame, according to an embodiment of the invention.

At step 500 a check is made as to whether a burst control packet CTR has been received. If yes, at step 510 variables are initialized, including setting variable "Grant" to zero, initializing a timeout counter, setting a sequence number SN to that of the received burst. Then at steps 520 to 550, checks are made before sending a request to the relevant output controller. The first check is whether the conditions for sending the request are met at step 520. These conditions can be summarised as follows. If there are enough tokens in the bucket (token—length of burst<threshold), and either the previous sequence number has been requested and acknowledged, or the timeout has expired, then the current request can be sent. At step 530 if the timeout is not expired then step 540 is carried out, otherwise step 520 is repeated. At step 540, if the preceding acknowledge has been received, then step 550 is carried out, otherwise step 520 is repeated. At step 550, a pointer PTR is set to the sequence number following that of the last burst to be acknowledged. Then step 520 uses this pointer to check whether the previous sequence number has been acknowledged, to try to maintain the correct order of bursts.

Then if the conditions are met, at step 560, a request is sent to the relevant output port controller, indicating the flow ID, the sequence number and burst length. At step 570, the grant variable is tested to see if the burst can be sent. If grant=0, then at step 580, if an acknowledge has been received, the grant variable is set at step 590 to 1. Step 570 is repeated and if grant does not equal 1 then the burst is sent to the switch at step 600 and the token variable is updated by removing a number tokens equal to the length of the burst from the bucket, and the pointer PTR is incremented.

Concluding Remarks

The proposed solution, based on the adoption of a control packet to delimit a variable number of Ethernet packets, can enable more efficient packet transmission without modifying basic Ethernet functionalities.

It exploits the sequence number carried by the burst control packet to support the splitting of a flow among different output links. Consequently it optimizes bandwidth utilization outperforming solutions that met the requirement specified by the Ethernet Link Aggregation standard (IEEE 802.1AX 2008 Link Aggregation—IEEE Standard for Local and metropolitan area networks) to maintain packet ordering by ensuring that all packets of a given flow are transmitted on a single link in the order that they are generated.

In addition, analogously to such solutions, it does not involve the adding (or modification) of any information to the data packet, since the sequence number is carried only by the control packet; nor long buffering or processing delay at the receiver in order to re-order packets, since the traffic manager assures that in each node consecutive bursts of a flow split on different links are transmitted at most simultaneously.

The proposed traffic management mechanism can be based on a simple request-acknowledge granting mechanism. A "request to send" message for a given burst is issued if its associated token bucket balance is sufficient to assure its load and if it previous burst has received grant from the output scheduler. It does not require an additional scheduling mechanism at the input cards.

Further reduction of scheduling complexity and consequently computation delay is due to the fact that the number of queues to manage is smaller than the case where per output port virtual output queuing is assumed in the ring cards.

Moreover being permits issued on a per burst basis, probability that permits from different output cards are received at the same time is low. This allows to reduce delays. At the same time improvement in bandwidth efficiency obtained with the proposed traffic management mechanism allows to respect the agreed performance in terms of delay and bandwidth for both guaranteed and best effort traffic.

The embodiments described as examples can help to simplify bandwidth provisioning and admission control, since the multiple ring channels are handled as a single aggregated channel, as well as protection mechanisms.

Multicast traffic can be easily handled by defining a set of multicast addresses to which a set of first-level queues in the local card are associated. The multicast address will allow nodes to determine if to drop and/or forward packets.

Other variations and embodiments can be envisaged within the claims.

The invention claimed is:

1. A method of operating a packet switching node coupled by links to other nodes, as an ingress node, the method comprising:
  receiving packets belonging to a specified packet flow, to be sent on to a destination node;
  assembling the received packets of the flow into bursts of packets, the bursts being groups of consecutive packets belonging to the flow, each burst having a burst control packet, the burst control packet indicating a sequence of the burst in the flow, to enable the sequence to be maintained after transmission;
  determining whether to distribute the flow;
  selecting, if the flow is to be distributed, at least two of the links to use for sending on the bursts of the flow towards the destination node; and
  distributing the bursts of the flow between the selected links by:
    forwarding a first of the bursts for switching to a first output port, for transmission over a first of the selected links; and
    forwarding a second of the bursts for switching to a second output port, for transmission over a second of the selected links.

2. The method of claim 1, the received packets being Ethernet packets, and the burst control packet being an Ethernet packet.

3. The method of claim 1, the node having at least two buffers for queueing the bursts before switching, each of the buffers being associated with at least one of the output ports, the method having the step of queueing the bursts in whichever of said buffers corresponds to their selected output port.

4. The method of claim 1, the node having a channel allocation table indicating a bandwidth available for each node on each link, and the distributing step comprising determining what proportion of a total bandwidth needed for the flow, is to be distributed to each of the selected links, based on an occupation level for each link.

5. The method of claim 1, having the step of controlling when the bursts are forwarded by sending a switch request for a given burst to an output controller for its selected output port, and forwarding the burst for switching when the output controller sends an acknowledgement to allow the switching.

6. The method of claim 5, the sending of the acknowledgement being dependent on a preceding burst in the sequence having been acknowledged.

7. The method of claim 1, having the step of controlling when the bursts are forwarded according to an indication of the sequence of the bursts of a given flow.

8. The method of claim 1, having the step of controlling when the bursts are forwarded, according to a rate limit for the flow for the link.

9. The method of claim 1, the flow having a specified class of service, and the step of controlling when the bursts are forwarded being made according to the class of service of the flow.

10. A method of controlling switching in a packet switching node, the method comprising:
  determining whether to distribute the flow, wherein packets belonging to the flow is received at the node, the packets being assembled into bursts of packets, the bursts being groups of consecutive packets belonging to the flow, each burst having a burst control packet, the burst control packet indicating a sequence of the burst in the flow;
  selecting, if the flow is to be distributed, at least two of the links to use for sending on the bursts of the flow towards the destination node; and
  distributing the bursts of the flow between the selected links by:
    forwarding a first of the bursts for switching to a first output port, for transmission over a first of the selected links; and
    forwarding a second of the bursts for switching to a second output port, for transmission over a second of the selected links according to the indicated sequence for the flow.

11. A method of operating a packet switching node coupled by links to other nodes, as an egress node, the method comprising:
  receiving at line input ports, bursts of packets being groups of consecutive packets belonging to a specified packet flow, sent over different links from another node, each burst having a burst control packet, the burst control packet indicating a sequence of the burst in the flow;
  selecting a local output port for packets of the flow;
  switching the bursts to the selected local output port; and
  ordering the packets of the bursts of a same flow, according to the indicated sequence.

12. A method of operating a packet switching node coupled by links to other nodes, as an intermediate node, the method comprising:
  receiving at line input ports, bursts of packets being groups of consecutive packets belonging to a specified packet flow, sent from another node, each burst having a burst control packet, the burst control packet indicating a sequence of the burst in the flow;
  determining if the flow is distributed;

upon determining the flow is not distributed, determining whether to distribute it over different links to different adjacent nodes;

upon determining the flow is distributed and to be combined, determining whether to recombine it;

upon determining the flow is distributed and not to be recombined, selecting at least two of the links to use for sending on the bursts of the flow towards a destination node, and distributing the flow between the selected links by:

forwarding a first of the bursts for switching to a first output port, for transmission over a first of the selected links; and forwarding a second of the bursts for switching to a second output port, for transmission over a second of the selected links according to the indicated sequence for the flow.

13. A traffic controller for controlling a packet switching node coupled by links to other nodes, the node comprising:

a local input port for receiving packets belonging to a specified packet flow, to be sent on to a destination node, a burst assembler for assembling the received packets of that flow into bursts of packets, the bursts being groups of consecutive packets belonging to the flow, each burst having a burst control packet, the burst control packet indicating a sequence of the burst in the flow, to enable the sequence to be maintained after transmission, and a switch coupled to the local input port and to output ports, the traffic controller being arranged to perform the following:

selecting at least two of the links to use for sending on the bursts of this flow towards the destination node; and being coupled to the burst assembler to distribute the flow between the selected links by forwarding a first of the bursts from a first burst assembler queue to the switch for switching to a first output port, for transmission over a first of the selected links, and by forwarding a second of the bursts from a second burst assembler queue to the switch for switching to a second output port, for transmission over a second of the selected links.

14. The traffic controller of claim 13, wherein the node comprises at least two buffers for queueing the bursts before switching, each of the buffers being associated with at least one of the output ports, the traffic controller being coupled to control said buffers to queue the bursts in whichever of said buffers corresponds to their selected output port.

15. The traffic controller of claim 13, further comprising:

an output controller associated with a group of output ports, and a forwarding controller coupled to the output controller to control when the bursts are forwarded by sending a switch request for one of the bursts to the output controller associated with the group of output ports selected for the respective burst, and the forwarding controller being arranged to forward the respective burst for switching when it receives an acknowledgement of the request from the output controller to allow the switching.

16. The traffic controller of claim 13, the flow having a specified class of service, and the burst assembler having buffers for queueing the bursts according to a class of service of the flow.

17. A packet switching node coupled by links to other nodes, the node comprising:

a local input port for receiving packets belonging to a specified packet flow, to be sent on to a destination node, a burst assembler for assembling the received packets of that flow into bursts of packets, the bursts being groups of consecutive packets belonging to the flow, each burst having a burst control packet, the burst control packet indicating a sequence of the bursts in the flow, to enable the sequence to be maintained after transmission, a switch coupled to the local input port and to output ports, and a traffic controller being arranged to perform the following:

selecting at least two of the links to use for sending on the bursts of this flow towards the destination node; and being coupled to the burst assembler to distribute the flow between the selected links by:

forwarding a first of the bursts from a first burst assembler queue to the switch for switching to a first output port, for transmission over a first of the selected links, and forwarding a second of the bursts from a second burst assembler queue to the switch for switching to a second output port, for transmission over a second of the selected links.

18. The packet switching node of claim 17, wherein the node having at least two buffers for queueing the bursts before switching, each of the buffers being associated with at least one of the output ports, the traffic controller being coupled to control said buffers to queue the bursts in whichever of said buffers corresponds to their selected output port.

19. The packet switching node of claim 17, wherein the traffic controller has an output controller associated with a group of output ports, and having a forwarding controller coupled to the output controller to control when the bursts are forwarded by sending a switch request for one of the bursts to the output controller associated with the group of output ports selected for the respective burst, and the forwarding controller being arranged to forward the respective burst for switching when it receives an acknowledgement of the request from the output controller to allow the switching.

20. The packet switching node of claim 17, wherein the flow has a specified class of service, and the burst assembler having buffers for queueing the bursts according to a class of service of the flow.

* * * * *